United States Patent Office 2,851,061
Patented Sept. 9, 1958

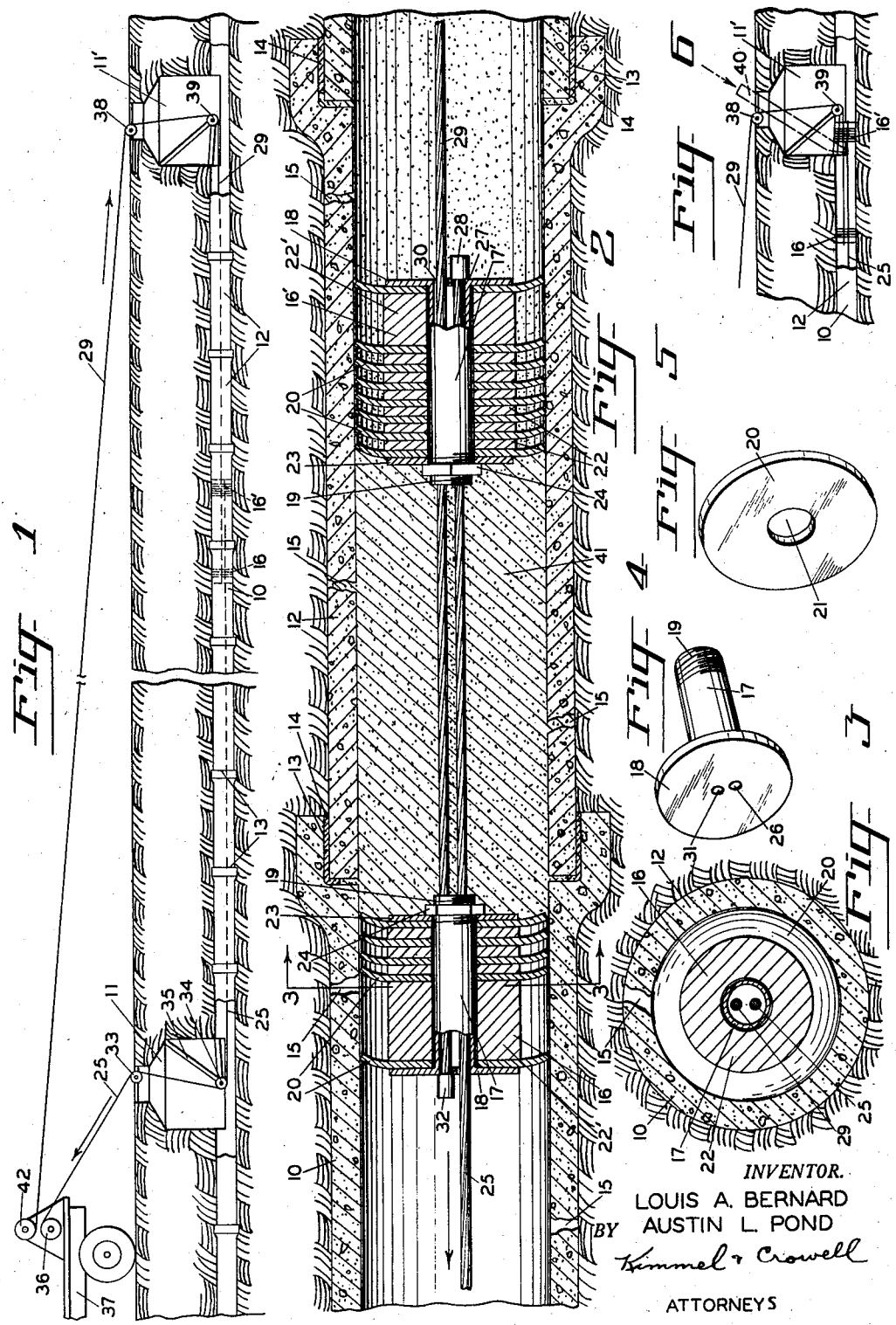

2,851,061

DEVICE FOR SEALING SEWER PIPE LINES

Louis A. Bernard, Eugene, and Austin L. Pond,
Springfield, Oreg.

Continuation of application Serial No. 481,571, January 13, 1955. This application December 26, 1957, Serial No. 705,451

6 Claims. (Cl. 138—97)

This invention relates to a device for sealing pipe lines and is particularly adapted for sealing leaking sewer lines, and is a continuation of my co-pending application entitled, Device for Sealing Sewer Pipe Lines, Serial No. 481,571, filed January 13, 1955 now abandoned.

The primary object of the invention is to apply a special quick drying sealer within sewer lines and the like to seal the joints and cracks thereof without digging up the lines.

Another object of the invention is to develop a pressure within the device for forcing the sealer into the joints and cracks of the pipe.

A still further object of the invention is the designing of a device for applying a liner within a sewer that is somewhat flexible in its nature, so that obstructions can be passed without interfering with the operation of the device.

And a still further object of the invention is the designing of a device of the type described that is strictly mechanical in nature, eliminating any use of electrical energy in its operation or any energy that would cause an explosion within the sewer line.

Other and further objects and advantages of this invention will become more apparent from a consideration of the following specification when read in conjunction with the annexed drawing, in which:

Figure 1 is a diagrammatical sectional view of a conventional sewer line, illustrating the use of our new and improved sealing device.

Figure 2 is an enlarged sectional view of the sewer pipe line and our sealing device being operated therein.

Figure 3 is an end sectional view, taken on line 3—3 of Figure 2.

Figure 4 is a perspective view of one of the elements employed by the device.

Figure 5 is a perspective view of another of the elements employed.

Figure 6 is a diagrammatical sectional view of a sewer line, partially broken away, illustrating the charging or loading of the device with a sealing paste.

Referring more specifically to the drawing, the conventional sewer line is indicated by numeral 10. The usual manholes are indicated by numerals 11 and 11'. The pipe line is made up of the usual sections 12, coming together with the conventional joints 13. When these pipes are laid they are sealed at 14. During the life of the sewer line, cracks 15 frequently develop, and also the seal 14 may become defective allowing the lines to leak, both from without and within. Ordinarily these pipe lines have to be dug up at a great expense and resealed or replaced, but with our invention the pipe line can be relined and sealed without digging the same up.

The device consists of a pair of flexible pistons 16 and 16' having centrally and axially extending tubular hubs 17 and 17'. Formed integral with one end of each hub are flanges 18. The opposite end of the hub is threaded at 19. A plurality of flexible disks 20, separated by spacers 22, 22', are adapted to be threaded over the hubs by way of their openings 21, after which the disks and spacers are tightened against the flanges 18 by tightening the lock nuts 24 against the rigid retaining washers 23.

A cable 25 is threaded through one of the openings 26 of the flange 18 and extends through the hub 17 into the hub 17'. The cable 25 is dead-ended at 27 by the usual cable ferrule 28. A second cable 29 is threaded through the opening 30 of the flange 18 through the hub 17' into the hub 17 through the opening 31 and deadended at this point by the ferrule 32.

The cable 25 is trained about a sheave 33 mounted within the upper opening of the manhole 11 and over the sheave 34, being supported by the framework 35 at the lower end of the manhole and into the sewer line. This cable is trained about the winding drum 36 of a conventional hoisting device mounted upon a truck 37. The cable 29 is trained about the sheaves 38 and 39 located within the manhole 11'.

Referring to Figure 6, the sealing device is indicated entering the pipe line from the manhole 11'. A chute 40, indicated by broken lines, indicates how the sealing material 41 is entered between the pistons 16 and 16'. When the space between the pistons is filled, the hoisting drum 36 is put into motion causing a pressure therebetween. This forces the sealing material out into the cracks 15 and joints 13 and along the inner surface of the pipe line, thereby sealing the cracks and joints, as well as lining the interior of the pipe.

In order to create this pressure, the cable 29 is pulled tightly by the hoisting drum 42. This drum resists the pull exerted by the drum 36. The amount of resistance applied between these drums will depend upon the amount of pressure being developed between the pistons 16 and 16'. It has been found that if the flexible disks 20 are made from a proper plastic material they will stand the wear and tear developed in the operation of the device, although we do not wish to be limited to any particular material.

The sealing material 41 is preferably one of the recently developed types having the characteristics of drying very quickly and are therefore readily adapted to be used in connection with this device. The material is made from ordinary cement and a chemical, but any suitable, preferably quick-drying sealing material will do for the purposes of this invention.

In operation the drum 36 pulls the device by way of the cable 25 through the sewer line 10, while the cable 29 resists this pull by the action of the hoisting drum 42, pulling back on the same, thereby causing the pressure required for forcing the sealing material into the cracks and joints.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A device for sealing cracks and joints of sewer pipes comprising a pair of elongated substantially hollow tubular members, each of said members having a radial flange at one of their respective ends, each of said flanges having a pair of apertures extending transversely therethrough and communicating with the interior of said members, a plurality of disks formed of flexible material mounted on each of said members, means for maintaining said disks on each of said members in longitudinally spaced relation, each of said members being externally threaded at the other of their respective ends, a lock washer mounted on each of said other ends of said tubular members, a nut threaded on said threaded end of said tubular members whereby tightening of said nut will effect compression of said spacers and said disks between said flanges and said lock washers, a cable threaded through both of said members and through an aperture formed in each of said flanges, means fixedly preventing the withdrawal of said cable through said apertures and said members, a second cable threaded through each of said members and the second aperture formed in each of said flanges, means for preventing the withdrawal of said cable through said apertures and said members, and means connected with the other ends of said cables for effecting relative movement of said tubular members toward each other and for effecting, simultaneously therewith, movement of said tubular members in one direction through a sewer pipe.

2. A device for sealing cracks and joints in a sewer pipe comprising a pair of elongated substantially hollow tubular members, each of said members having a radial flange at one of their respective ends, each of said flanges being provided with a pair of apertures which extend transversely therethrough and are in open communication with the interior of said members, a plurality of flexible disks mounted on each of said members, resilient means interposed between said disks to effect longitudinal spacing thereof on each of their respective members, a lock washer mounted on each of said members adjacent the confronting ends thereof, said confronting ends being externally threaded, a lock nut mounted on each of said threaded ends whereby tightening of said nut will effect a compression of said spacers and disks on each of said tubular members between said flanges and said lock washers, a cable extending through said members and one of said apertures formed in each of said flanges, means for preventing the withdrawal of said cable through said apertures and said members, a second cable threaded through each of said members and the second of said apertures formed in each of said flanges, a winch connected with the other end of one of said cables, a second winch connected with the other end of the other of said cables, said winches exerting a force on their respective cables to produce relative movement of said members toward each other, and to move both of said members in one direction through a sewer pipe.

3. A device for sealing cracks and joints of sewer pipes comprising a pair of elongated substantially hollow tubular members, each of said members having a radial flange at one of their respective ends, each of said flanges having a pair of apertures extending transversely therethrough and communicating with the interior of said members, a plurality of disks formed of flexible material mounted on each of said members, means for maintaining said disks on each of said members in longitudinally spaced relation, means on the other ends of said members to effect compression of said spacers and said disks between said flanges and said means, a cable threaded through both of said members and through an aperture formed in each of said flanges, means fixedly preventing the withdrawal of said cable through said apertures and said members, a second cable threaded through each of said members and said second aperture formed in each of said flanges, means for preventing the withdrawal of said last named cable through said last named apertures and said members, and means connected with the other ends of said cables for effecting relative movement of said tubular members toward each other for effecting simultaneously therewith movement of said tubular members in one direction through a sewer pipe.

4. A device for sealing cracks and joints of sewer pipe comprising a pair of elongated substantially hollow tubular members, each of said members having a plurality of disks formed of flexible material mounted thereon, means for maintaining said disks on each of said members in longitudinally spaced relation, means on the other ends of said members to effect compression of said spacers and said disks on said members, a cable threaded through both of said members and having an end thereof fixedly secured to one of said members, a second cable threaded through each of said members and having an end thereof fixedly secured to the other of said members, and means connected with the other ends of said cables for effecting relative movement of said tubular members toward each other and for flexing, simultaneously therewith, movement of said tubular members in one direction to a sewer pipe.

5. Apparatus for cleaning and repairing a pipe line comprising at least one pair of disks, adapted for disposition, at their peripheries, in wiping contact with the wall of a pipe line, said disks defining between them a chamber for receiving a quantity of a fluid surface filling material; a first elongated means having one end thereof engaging one of the disks, said first means being slidable through the other disk, and a second elongated means having one end thereof engaging said other disk, means connected with said first elongated means for pulling said first elongated means in a direction to move one of said disks engaged therewith toward the other of said disks through said pipe line, and means connected with said second elongated means for retarding movement of said second elongated means and the other of said disks engaged therewith, said pulling means and said retarding means moving said disks together to apply pressure to the filling material therebetween during travel of the disks along said pipe line.

6. Apparatus for cleaning and interiorly coating a pipe line comprising; at least one pair of axially spaced disks adapted for peripheral wiping contact with a wall of a pipe line, said disks defining between them a chamber for a fluid coating substance, a first means engaging one and slidable through the other disk and projecting at one end beyond the space between the disks in one direction; a second means engaging the other disk and slidable through said one disk, the second means projecting at one end beyond said space in the opposite direction, and winch means remote from the disks, said winch means being connected with said first means and said second means so that said first and said second means are pulled in opposite directions outwardly from said disks to shift said disks in opposite directions toward each other, said winch means being adapted for exerting a pulling force on said first means at a value exceeding that of the pulling force exerted on said second means to bodily shift the disks in one direction axially within the pipe while maintaining pressure on said disks tending to move them relative to each other in directions to close the space therebetween.

References Cited in the file of this patent

UNITED STATES PATENTS 1,746,071     Cotton                 Feb. 4, 1930

FOREIGN PATENTS 685,637     Great Britain            Jan. 7, 1953